(12) United States Patent
Sato

(10) Patent No.: US 8,077,761 B2
(45) Date of Patent: Dec. 13, 2011

(54) DATA TRANSMISSION AND RECEPTION MODULE, AND METHOD OF ADJUSTING RECEPTION THRESHOLD VALUE THEREOF

(75) Inventor: Tetsuji Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 692 days.

(21) Appl. No.: 12/010,322

(22) Filed: Jan. 23, 2008

(65) Prior Publication Data

US 2008/0175341 A1 Jul. 24, 2008

(30) Foreign Application Priority Data

Jan. 24, 2007 (JP) ................... 2007-014327

(51) Int. Cl.
*H04B 1/38* (2006.01)
*H04L 5/16* (2006.01)

(52) U.S. Cl. ............................ 375/219; 710/1

(58) Field of Classification Search ............ 375/219
See application file for complete search history.

(56) References Cited

U.S. PATENT DOCUMENTS

| | | | | |
|---|---|---|---|---|
| 2003/0031282 A1* | 2/2003 | McCormack et al. | ...... | 375/355 |
| 2005/0259764 A1* | 11/2005 | Hung Lai et al. | ............ | 375/317 |
| 2006/0008279 A1* | 1/2006 | Chiang et al. | ................. | 398/202 |

FOREIGN PATENT DOCUMENTS

JP 2005-130303 5/2005

OTHER PUBLICATIONS

"XFP Revision 4.5 Specification", [Online], Published Aug. 31, 2005, Accessed Jan. 10, 2008, Whole Document (pp. 1-168), Web URL: <http://www.xfpmsa.org/cgi-bin/msa.cgi>.

* cited by examiner

*Primary Examiner* — David C. Payne
*Assistant Examiner* — Erin File
(74) *Attorney, Agent, or Firm* — Staas & Halsey LLP

(57) ABSTRACT

Disclosed is a method of adjusting a reception threshold value in data reception. The method comprises: generating a transmission signal on the basis of a clock regenerated from a reception signal, determining a worst phase at which a bit error rate becomes maximum by changing a phase of the transmission signal, and adjusting a reception threshold value in the state of the worst phase. The worst phase is determined by detecting the bit error rate by shifting the phase of the transmission signal by a predetermined interval while fixing the reception threshold value to a predetermined value.

8 Claims, 15 Drawing Sheets

DATA TRANSMISSION AND RECEPTION MODULE, AND METHOD OF ADJUSTING RECEPTION THRESHOLD VALUE THEREOF

BACKGROUND OF THE INVENTION

1. Field of the Invention

The present invention relates to a method of adjusting a reception threshold value in data reception, and more particularly to a method of adjusting the reception threshold value of a reception signal to minimize the influence of a crosstalk signal from a transmission part on a reception part of a data transmission and reception module, and a data transmission and reception module using the method.

2. Description of the Related Art

Along with the demand for a wider bandwidth of a data network, the need for an increase of the capacity and the speed in data transmission has been increasing. For example, an optical communication device providing a transmission bandwidth of 10 Gbit/s has been increasingly introduced. A 10 Gbit/s optical transceiver module, which is a data transmission and reception module implementing the optical communication device, has been spreading, promoted by an industry standard called MSA (Multi Source Agreement). As a result, the improvement in performance and the reduction in size and cost of the module have been in progress. For example, in an XFP (10 Gbps Small Form Factor Pluggable) module compliant with the MSA, a transmission part and a reception part are integrated together to reduce the size of the module. As compared with a conventional 300-pin MSA SFF (Small Form Factor) optical transceiver module, the XFP module needs to be reduced to one sixth in size and one third in power consumption. The specification of the XFP module is disclosed in XFP REVISION 4.5 SPECIFICATION (<http://www.xfpmsa.org/cgi-bin/msa.cgi>).

In the reduction in size of a module, it is necessary to reduce the sizes of the transmission part and the reception part while improving the characteristic of the module. Particularly, in a module in which the transmission part and the reception part are integrated together, as in the XFP module, a crosstalk from the transmission part to the reception part constitutes a serious problem for the improvement in performance of the reception part. Techniques of removing a crosstalk signal include, for example, a technique described in Japanese Unexamined Patent Application Publication No. 2005-130303.

To improve the characteristic of the transmission part of the data transmission and reception module, the amplitude needs to be increased. Meanwhile, to improve the reception characteristic, a high-sensitivity APD (Avalanche Photodiode) device or the like is used, and thus the signal amplitude is substantially reduced. Therefore, to improve the reception characteristic of the data transmission and reception module in which the transmission part and the reception part are integrated together, as in the XFP pluggable module, for example, it is important to remove the crosstalk from the transmission part as much as possible. In such a module, however, the transmission part and the reception part are close to each other due to the small size of the module. Therefore, it is difficult to completely remove the crosstalk from the transmission part to the reception part.

SUMMARY

There is provided a method of adjusting a reception threshold value of a reception signal to minimize the influence of a crosstalk signal from a transmission part on a reception part of a data transmission and reception module, and a data transmission and reception module using the method.

According to an aspect of an embodiment, there is provided a method comprising: generating a transmission signal on the basis of a clock regenerated from a reception signal; changing the phase of the transmission signal to locate a phase of the transmission signal maximizing a bit error rate of the reception signal, and determining the located phase as the worst phase; and adjusting the reception threshold value in the state of the worst phase.

According to the method, the reception threshold value is optimally adjusted in the state of the worst phase. Therefore, irrespective of the phase of the transmission signal, it is possible to perform bit determination of the reception signal while preventing the deterioration of the reception signal due to a crosstalk signal attributed to, for example, the rise and fall of the transmission signal. Particularly, in a data transmission and reception module in which the transmission part and the reception part are integrated together, data reception can be performed in a state in which the influence of the crosstalk from the transmission part on the reception part is minimized.

Further, the method according to the aspect of the embodiment may be configured such that the worst phase is located by detecting the bit error rate while sequentially shifting the phase of the transmission signal by a predetermined value in a state in which the reception threshold value is fixed to a predetermined value.

According to the method, the phase of the transmission signal minimizing the bit error rate can be accurately located, even if the crosstalk signal attributed to the rise and fall of the transmission signal is deviated from the rise and fall timing of the transmission signal, or if there is a crosstalk caused by a factor other than the crosstalk signal attributed to the rise and fall of the transmission signal.

Further, the method according to the aspect of the embodiment may be configured to further include: setting an initial value to the reception threshold value making the bit error rate higher than a predetermined bit error rate; detecting the bit error rate while sequentially shifting the reception threshold value from the initial value by a predetermined value; and determining the reception threshold value minimizing the bit error rate as an optimal threshold value.

According to the method, irrespective of the phase of the transmission signal, the data reception can be performed in a state of the lowest bit error rate.

Further, the method according to the aspect of the embodiment may be configured to further include: setting an initial threshold value to the reception threshold value making the bit error rate higher than a predetermined allowable bit error rate; detecting the bit error rate while sequentially shifting the reception threshold value from the initial threshold value by a predetermined interval; and determining, as an optimal threshold value, the value obtained by multiplying by a predetermined correction coefficient the reception threshold value making the bit error rate first fall below the predetermined allowable bit error rate.

According to the method, it is possible to minimize the number of measurements of the bit error rate, and thus to effectively obtain the optimal threshold value.

According to the embodiment, it is possible to prevent the influence of the crosstalk from the transmission part on the reception part, and thus to improve the reception characteristic.

DESCRIPTION OF THE PREFERRED EMBODIMENTS

Figure 1:
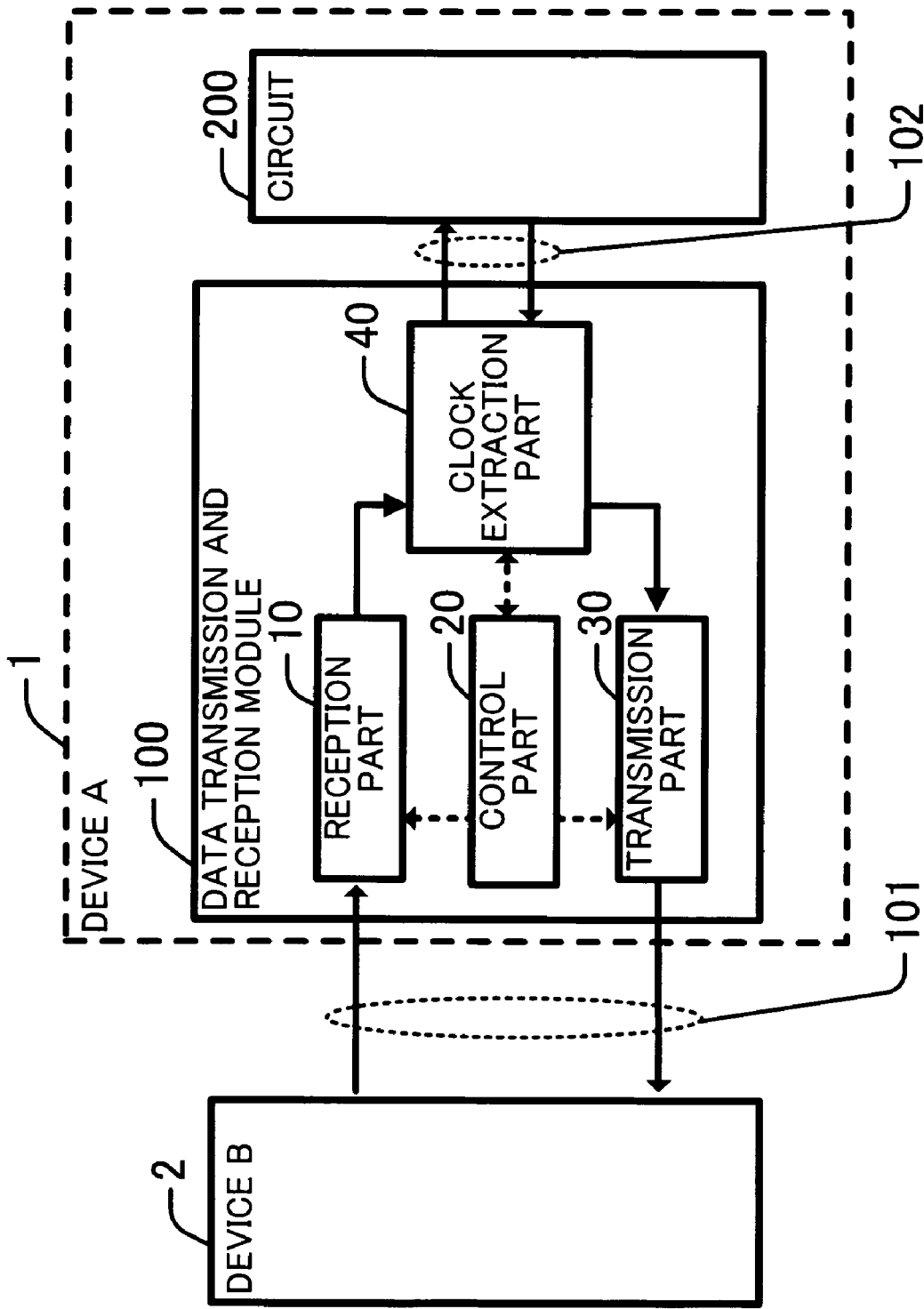
FIG. 1 illustrates a configuration example of a device incorporating therein a data transmission and reception apparatus according to an embodiment.

FIG. 1 illustrates a configuration example of a device incorporating therein a data transmission and reception module according to an embodiment. In the configuration example illustrated herein, an XFP pluggable module is used as a typical data transmission and reception module. A device 1 is a communication device incorporating therein the data transmission and reception module according to the embodiment. Meanwhile, a device 2 is a communication device having a data transmitting and receiving function, and may be either one of a device using a conventional technique and a device applied with the embodiment.

Via a data transmission and reception module 100 according to the embodiment, the device 1 communicates with the device 2, which is the communication partner of the device 1. Further, in the device 1, a circuit 200 fulfills the function of the device 1 by exchanging data with the device 2 via the data transmission and reception module 100. In the example of FIG. 1, the data transmission and reception module 100 according to the embodiment includes a reception part 10, a control part 20, a transmission part 30, and a clock extraction part 40.

The reception part 10 receives a data signal from the device 2, which is the communication partner of the device 1, and transfers the received data signal to the clock extraction part 40.

On the basis of an instruction sent from the control part 20, the clock extraction part 40 performs a switching control of switching between a test mode and an active mode. In the active mode, the clock extraction part 40 outputs a reception signal output from the reception part 10 to the circuit 200 of the device 1 via a communication interface 102, and outputs a transmission signal output from the circuit 200 to the transmission part 30. Meanwhile, in the test mode, the clock extraction part 40 performs bit determination while comparing the reception signal output from the reception part 10 with a predetermined reception threshold value, and demodulates the reception signal into a digital signal. Then, the clock extraction part 40 extracts clock information from the reception signal and regenerates a clock. Thereafter, on the basis of the regenerated clock, the clock extraction part 40 generates a transmission signal of a predetermined pattern, performs phase adjustment of the transmission signal, and then outputs the transmission signal to the transmission part 30. In the test mode, the communication with the circuit 200 is performed in a shutdown state entered by a changeover switch. The adjustment of the reception threshold value according to the embodiment is performed in the test mode, and the test mode is switched to the active mode when an optimal threshold value obtained after the adjustment has been set in the clock extraction part 40. The reception signal of normal operation data is demodulated by the bit determination based on the optimal threshold value, and is transferred to the circuit 200. The adjustment of the reception threshold value is performed while the bit error rate of the reception signal is detected.

The control part 20 performs a variety of controls on the reception part 10, the transmission part 30, and the clock extraction part 40. Details of the controls will be later described with reference to FIG. 2.

On the basis of an instruction sent from the control part 20, the transmission part 30 sets the output power of the transmission signal transferred from the clock extraction part 40. Then, via a communication interface 101, the transmission part 30 transmits the transmission signal to the device 2 connected thereto.

In the device 1 applied with the above-described data transmission and reception module according to the embodiment, only one data transmission and reception module is typically illustrated for the convenience of explanation. However, the device 1 is not limited to the above configuration, and may include an arbitrary number of data transmission and reception modules. Therefore, the number of the device 2, which is the communication partner of the device 1, is also arbitrary, not limited to one. Further, the circuit 200 is provided depending on the function fulfilled by the device 1. The configuration of the circuit 200 does not affect the nature of the embodiment. Thus, detailed description thereof will be omitted.

Figure 2:
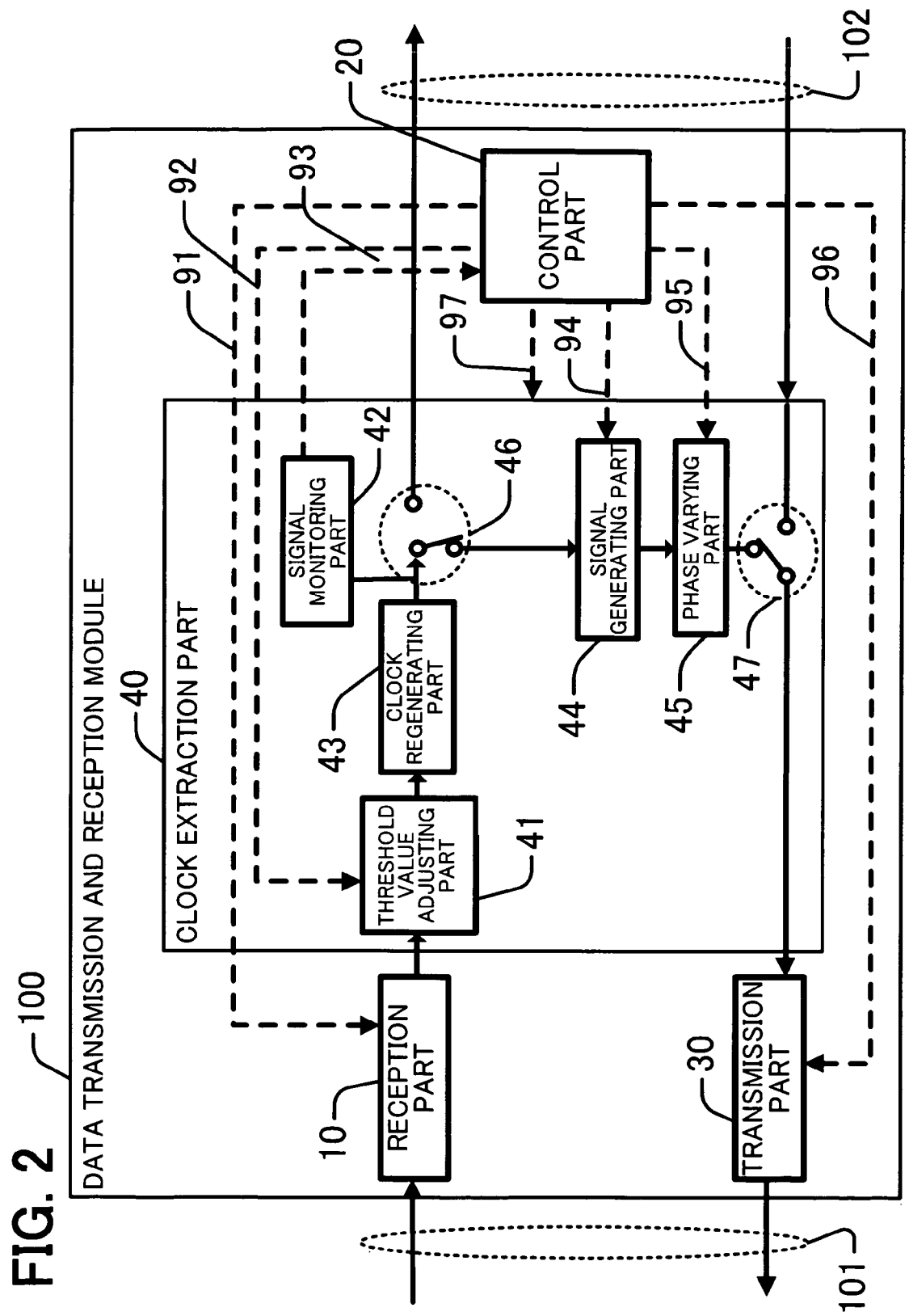
FIG. 2 illustrates a configuration example of the data transmission and reception apparatus according to the embodiment.

FIG. 2 illustrates a configuration example of the data transmission and reception module according to the embodiment. As illustrated in the configuration example of the device in the foregoing FIG. 1, the data transmission and reception module 100 according to the embodiment includes the reception part 10, the control part 20, the transmission part 30, and the clock extraction part 40.

Control signals transferred between the control part 20 and the reception part 10, the transmission part 30, and the clock extraction part 40 are indicated by dotted arrows.

The clock extraction part 40 may be configured to include, for example, a threshold value adjusting part 41, a signal monitoring part 42, a clock regenerating part 43, a signal generating part 44, and a phase varying part 45.

The threshold value adjusting part 41 stores, as the reception threshold value, a bit determination threshold value constituting the reference value in the bit determination of the reception signal transferred from the reception part 10. On the basis of an instruction of a control signal 92 sent from the control part 20, the threshold value adjusting part 41 changes the reception threshold value. Then, on the basis of the changed threshold value, the threshold value adjusting part 41 performs the bit determination of the reception signal and digital-demodulates the reception signal.

The signal monitoring part 42 monitors the bit error rate of the reception signal, and notifies the control part 20 of the result of the monitoring through a control signal 93.

The clock regenerating part 43 extracts clock information included in the reception signal transferred from the threshold value adjusting part 41, and regenerates a clock.

In synchronization with the clock regenerated in the clock regenerating part 43, the signal generating part 44 generates a signal pattern instructed by the control part 20 through a control signal 94, such as a PN (Pseudo Noise) pattern, for example. In this process, the control to start and stop the generation of the signal pattern is also performed through the control signal 94 sent from the control part 20.

On the basis of a value notified by the control part 20 through a control signal 95, the phase varying part 45 adjusts the phase of the signal generated in the signal generating part 44. In a 10 Gbit/s data transmission and reception module, for example, the phase varying part 45 performs such adjustment as shifting the phase in picoseconds ($10^{-12}$ seconds).

The reception part 10 is for performing reception processing of the data signal transmitted from the device 2, which is the communication partner of the device 1, via the communication interface 101. If the data signal is an optical signal, for example, the reception part 10 converts the optical signal into an electrical signal, and transfers the converted signal to the threshold value adjusting part 41. If the module uses an APD, for example, the module may be configured such that a voltage value which should be maintained is instructed to the reception part 10 by the control part 20 through a control signal 91 in the above process.

Via the communication interface 101, the transmission part 30 transmits the transmission signal, which has been generated in the signal generating part 44 and phase-adjusted by the phase varying part 45, to the device 2, which is the communication partner of the device 1. The module may be configured such that the power value of the transmission output, for example, is instructed to the transmission part 30 in the above process through a control signal 96 sent from the control part 20.

On the basis of an instruction sent from a not-illustrated circuit managing and controlling the entirety of the device 1, for example, the control part 20 performs the switching control of the operation mode by switching changeover switches 46 and 47 of the clock extraction part 40 through a control signal 97. That is, to set in the test mode, the control part 20 switches the changeover switch 46 to transfer the reception signal output from the clock regenerating part 43 to the signal generating part 44, and switches the changeover switch 47 to output the transmission signal output from the phase varying part 45 to the transmission part 30. In the test mode, therefore, the communication interface 102 with the circuit 200 of the device 1 is cut off. Meanwhile, to set in the active mode, the control part 20 switches the changeover switch 46 to output the reception signal output from the clock regenerating part 43 to the circuit 200 of the device 1 via the communication interface 102, and switches the changeover switch 47 to output the transmission signal output from the circuit 200 of the device 1 to the transmission part 30. FIG. 2 illustrates an example in which the changeover switches 46 and 47 are in the test mode.

To adjust the reception threshold value, the control part 20 first sets the clock extraction part 40 in the test mode. Then, the control part 20 sets a predetermined threshold value in the threshold value adjusting part 41 to regenerate the clock from the reception signal and generate a signal of a predetermined pattern. The control part 20 then outputs the generated signal while adjusting the phase of the signal. Then, the control part 20 locates a phase of the transmission signal at which the error state notified by the signal monitoring part 42 is the worst, i.e., the bit error rate detected by the signal monitoring part 42 is maximized, and determines the located phase as the worst phase. Then, in the state of the located worst phase, the control part 20 adjusts the reception threshold value set in the threshold value adjusting part 41. Thereby, the control part 20 obtains a threshold value minimizing the bit error rate, and determines the obtained threshold value as the optimal threshold value. Then, the control part 20 sets the obtained optimal threshold value in the threshold value adjusting part 41 as the final reception threshold value. Thereafter, the control part 20 switches the changeover switches 46 and 47 of the clock extraction part 40 to set the operation mode to the active mode. Accordingly, the circuit 200 of the device 1 can receive the reception signal from the data transmission and reception module 100, with the influence of the crosstalk from the transmission part 30 on the reception part 10 minimized.

Figure 3:
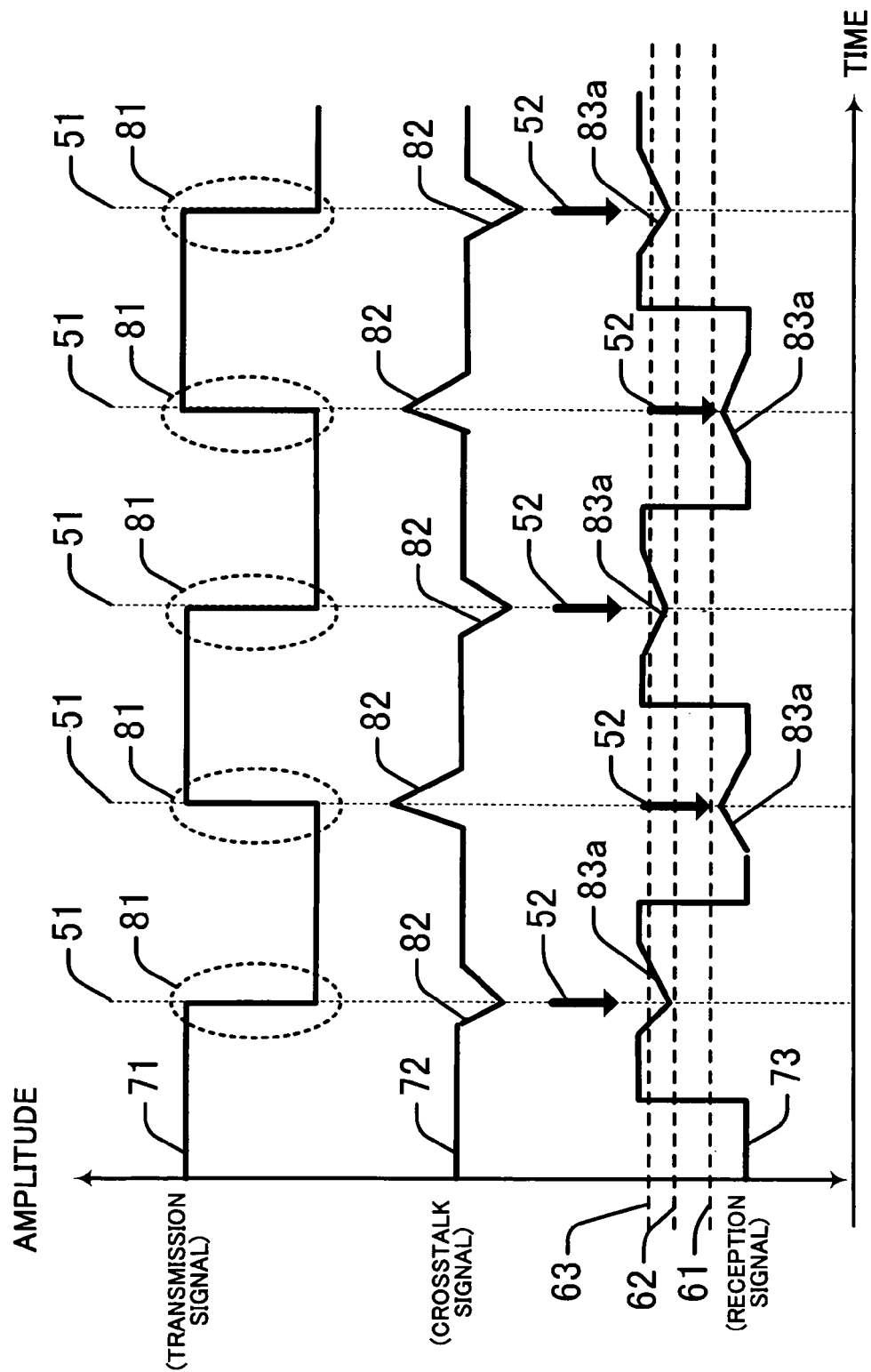
FIG. 3 is the first conceptual diagram illustrating the influence of a crosstalk from a transmission part on a reception part.

FIG. 3 is the first conceptual diagram illustrating the influence of the crosstalk from the transmission part on the reception part. The diagram illustrates a transmission signal 71, a crosstalk signal 72 attributed to the transmission signal 71, and a reception signal 73 deteriorated by the crosstalk signal 72, with the signals associated with one another on the same time axis. In the example illustrated herein, rise and fall timing 51 of the transmission signal 71 coincides with bit determination timing 52 of the reception signal 73. For the convenience of explanation, the present example illustrates a signal pattern in which the amplitude of the transmission signal 71 and the reception signal 73 repeats the ON/OFF cycle for every 1-bit pulse.

Generally, the magnitude of the crosstalk attributed to the transmission signal 71 tends to be maximized at the rise and fall timing of the signal (i.e., at portions 81 of FIG. 3). Thus, the amplitude of the crosstalk signal 72 attributed to the transmission signal 71 is increased in synchronization with the rise and fall of the transmission signal 71 (as in portions 82 of FIG. 3, for example). In the reception part 10 provided in proximity to the transmission part 30, therefore, the reception signal 73 tends to be deteriorated at the rise and fall timing of the transmission signal 71 (as in portions 83a of FIG. 3, for example).

In the example of FIG. 3, in which the rise and fall timing 51 of the transmission signal 71 coincides with the bit determination timing 52 of the reception signal 73, portions near the bit determination timing 52 of the reception signal 73 (i.e., central portions of respective bit signal pulses) are deteriorated. If the reception threshold value, i.e., the bit determination threshold value is not appropriately set, as in a case in which a threshold value 63 shown in FIG. 3 is used as the reception threshold value, for example, the bit determination is not correctly performed. As a result, the bit error rate is increased.

However, if the reception threshold value is set to a value between threshold values 61 and 62, for example, the bit determination is correctly performed. Accordingly, the bit error rate can be suppressed to a small value.

FIG. 3 described above illustrates an example in which the amplitude of the crosstalk signal 72 is maximized at the rise and fall timing of the transmission signal 71. In this case, the bit error rate is expected to be maximized by having the rise and fall timing of the transmission signal 71 coincide with the central portion of each of the bit signal pulses of the reception signal 73. However, the timing at which the amplitude of the crosstalk signal 72 is maximized may not necessarily coincide with and may be deviated from the rise and fall timing of the transmission signal 71, depending on the structure or the use environment of the data transmission and reception module. Further, the crosstalk may be generated by the influence of a factor other than the rise and fall of the transmission signal 71. According to the embodiment, therefore, the phase of the transmission signal 71 is adjusted while the bit error rate of the reception signal 73 is monitored, to thereby locate the worst phase of the transmission signal 71 maximizing the bit error rate. Thereby, the worst phase of the transmission signal 71 can be accurately located irrespective of the factors responsible for the occurrence of the crosstalk.

Figure 4:
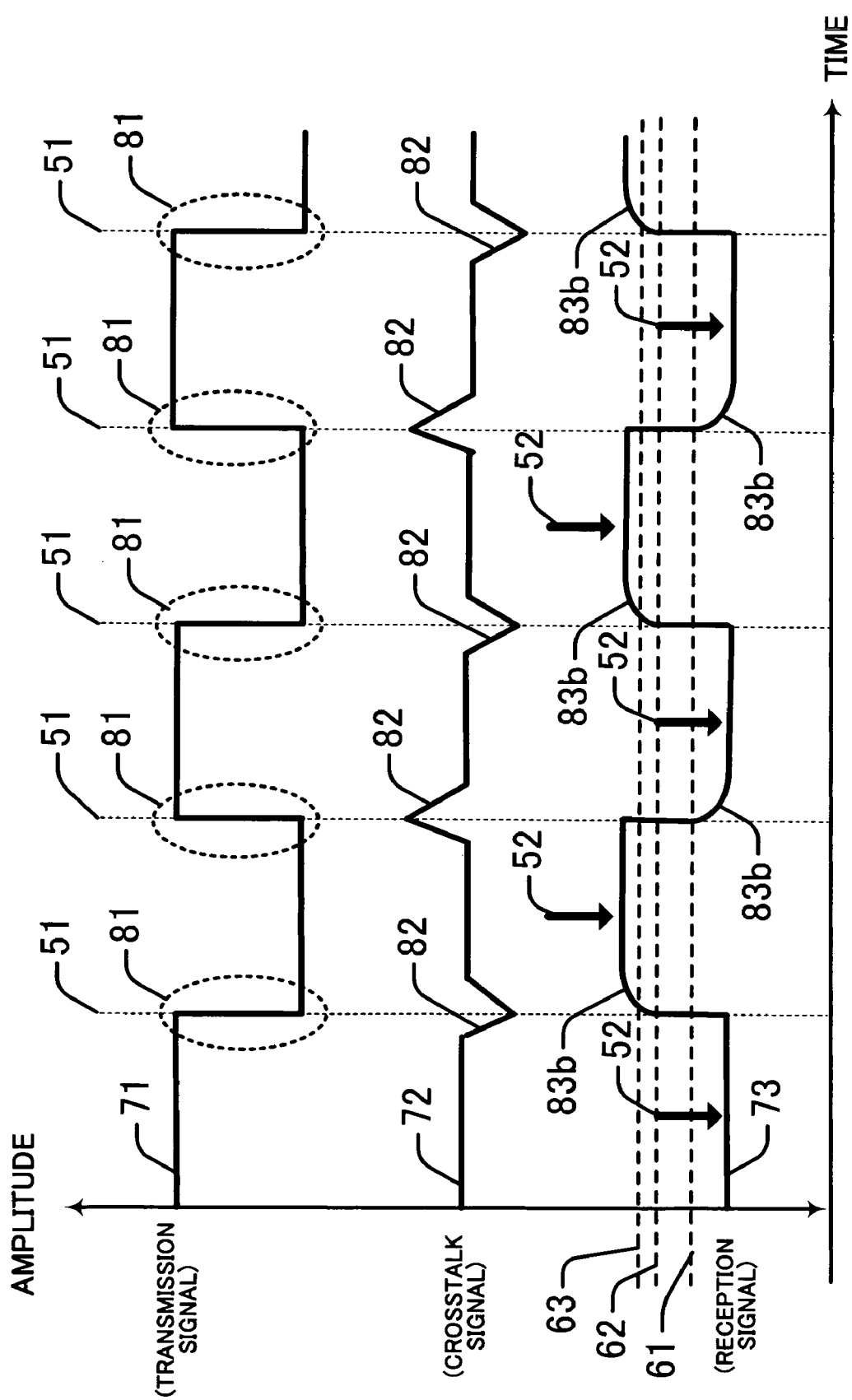
FIG. 4 is the second conceptual diagram illustrating the influence of the crosstalk from the transmission part on the reception part.

FIG. 4 is the second conceptual diagram illustrating the influence of the crosstalk from the transmission part on the reception part. The diagram illustrates an example in which the rise and fall timing 51 of the transmission signal 71 does not coincide with the bit determination timing 52 of the reception signal 73. In this case, the distance of the bit determination timing 52 from the rise and fall timing 51 of the transmission signal 71 is the greatest. Thus, the influence of the crosstalk signal 72 is assumed to be the smallest.

That is, the amplitude of the crosstalk signal 72 attributed to the transmission signal 71 is increased at the rise and fall timing 51 of the reception signal 73 (as in the portions 82 of FIG. 4, for example). Thus, rising and falling portions of the reception signal 73 (such as portions 83b of FIG. 4, for example) are deteriorated. However, the bit determination timing 52 of the reception signal 73, i.e., the central portions of the bit signal pulses are deviated in timing from the amplitude-increased portions 82 of the crosstalk signal 72. Thus, the influence of the crosstalk signal 72 is small. Accordingly, a bit error does not occur even if the bit determination is performed on the basis of the threshold value 63, and correct bit determination is performed.

As illustrated in FIGS. 3 and 4 described above, even with the use of the same threshold value 63 as the reception threshold value, the incidence ratio of bit determination errors changes due to the phase relationship between the transmission signal 71 and the reception signal 73. That is, the bit error is expected to occur infrequently when the rise and fall timing 51 of the transmission signal 71 is close to the rise and fall timing of the reception signal 73. Meanwhile, the bit error is expected to occur frequently when the rise and fall timing 51 of the transmission signal 71 is close to the central portion of each of the bit signal pulses of the reception signal 73, i.e., the bit determination timing 52.

Figure 5:
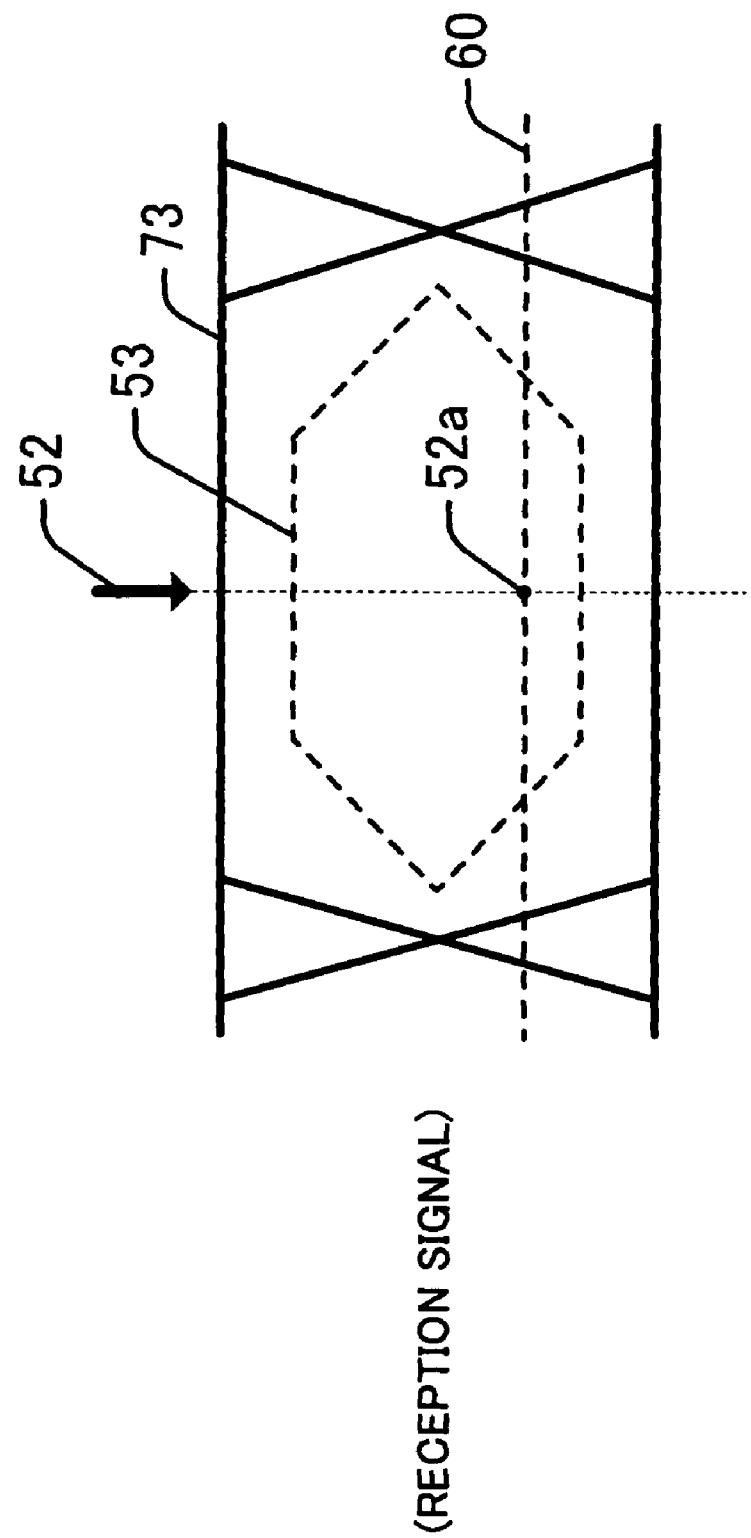
FIG. 5 illustrates the first display example of the eye pattern of a reception signal.

FIG. 5 illustrates the first display example of the eye pattern of the reception signal, in which the crosstalk hardly occurs and the bit error rate is low. The horizontal axis and the vertical axis represent the phase and the amplitude of the reception signal, respectively.

The reference numeral 53 indicates a mask area. If the mask area 53 includes the intersection point 52a of the bit determination timing (phase) 52 and the reception threshold value 60, it is understood that the bit determination of the reception signal 73 is correctly performed.

Figure 6:
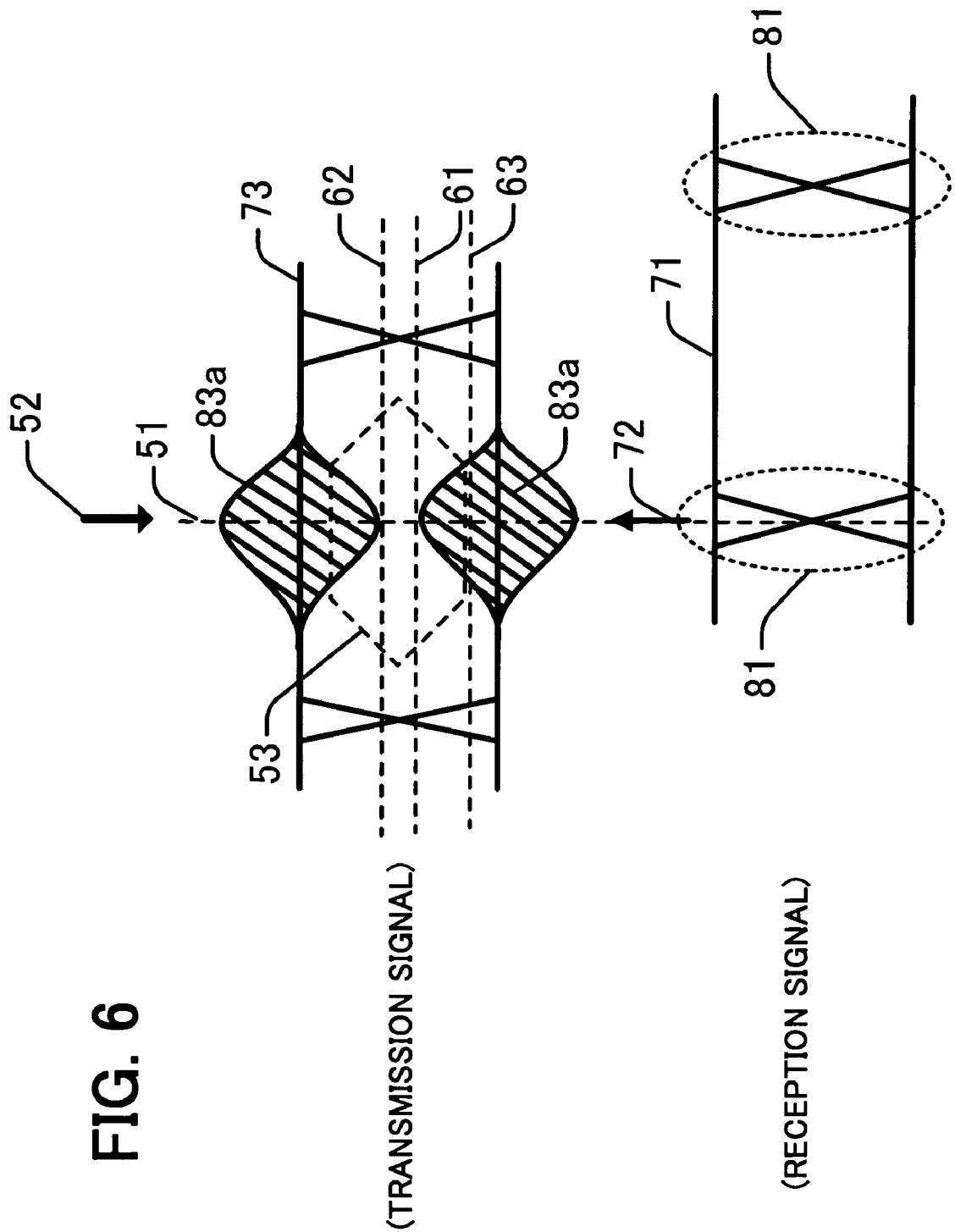
FIG. 6 illustrates the second display example of the eye pattern of the reception signal.

FIG. 6 illustrates the second display example of the eye pattern of the reception signal, in which the bit error rate is expected to be maximized. The eye pattern is shown in association with the phase of the transmission signal.

In a method of adjusting the reception threshold value according to the embodiment, the threshold value 63, with which the occurrence of the bit error is expected, is first set as a predetermined reception threshold value. In this state, the rise and fall timing (phase) 51 of the transmission signal 71 is sequentially shifted at a predetermined interval, and the phase maximizing the bit error rate is determined as the worst phase of the transmission signal 71. The example of FIG. 6 indicates that the phase becomes the worst when the rise and fall phase 51 of the transmission signal 71 is located in the proximity of the center of the bit signal pulse of the reception signal 73. This is because, as illustrated in the foregoing FIG. 3, the amplitude of the crosstalk signal 72 is increased at the rise and fall timing 51 of the transmission signal 71, and the occurrence probability of the bit error is the highest when the rise and fall timing 51 overlaps with the bit determination timing 52 of the reception signal 73. This is also observed from the display example of the eye pattern of the reception signal 73 in FIG. 6, in which the eye pattern is the narrowest in the central portion of the bit signal pulse due to the distorted portions 83a caused by the influence of the crosstalk signal 72. The distorted portions 83a of the reception signal 73 intrude into mask area 53 to reduce the area in which the bit determination is correctly performed. That is, it is understood that, to correctly perform the bit determination, the reception threshold value (the bit determination threshold value) should be set to a value between the threshold values 61 and 62, which is unaffected by the crosstalk signal 72 even at the worst phase 51 shown in FIG. 6.

As described above, according to the embodiment, the bit error rate is monitored while the phase of the transmission signal is shifted by a predetermined value in the state in which the reception threshold value is fixed to a predetermined value, so that the phase maximizing the bit error rate is located as the worst phase. Accordingly, the worst phase can be accurately located, even if the crosstalk signal attributed to the rise and fall of the transmission signal is deviated from the rise and fall timing of the transmission signal, or if there is a crosstalk caused by a factor other than the crosstalk signal attributed to the rise and fall of the transmission signal.

Figure 7:
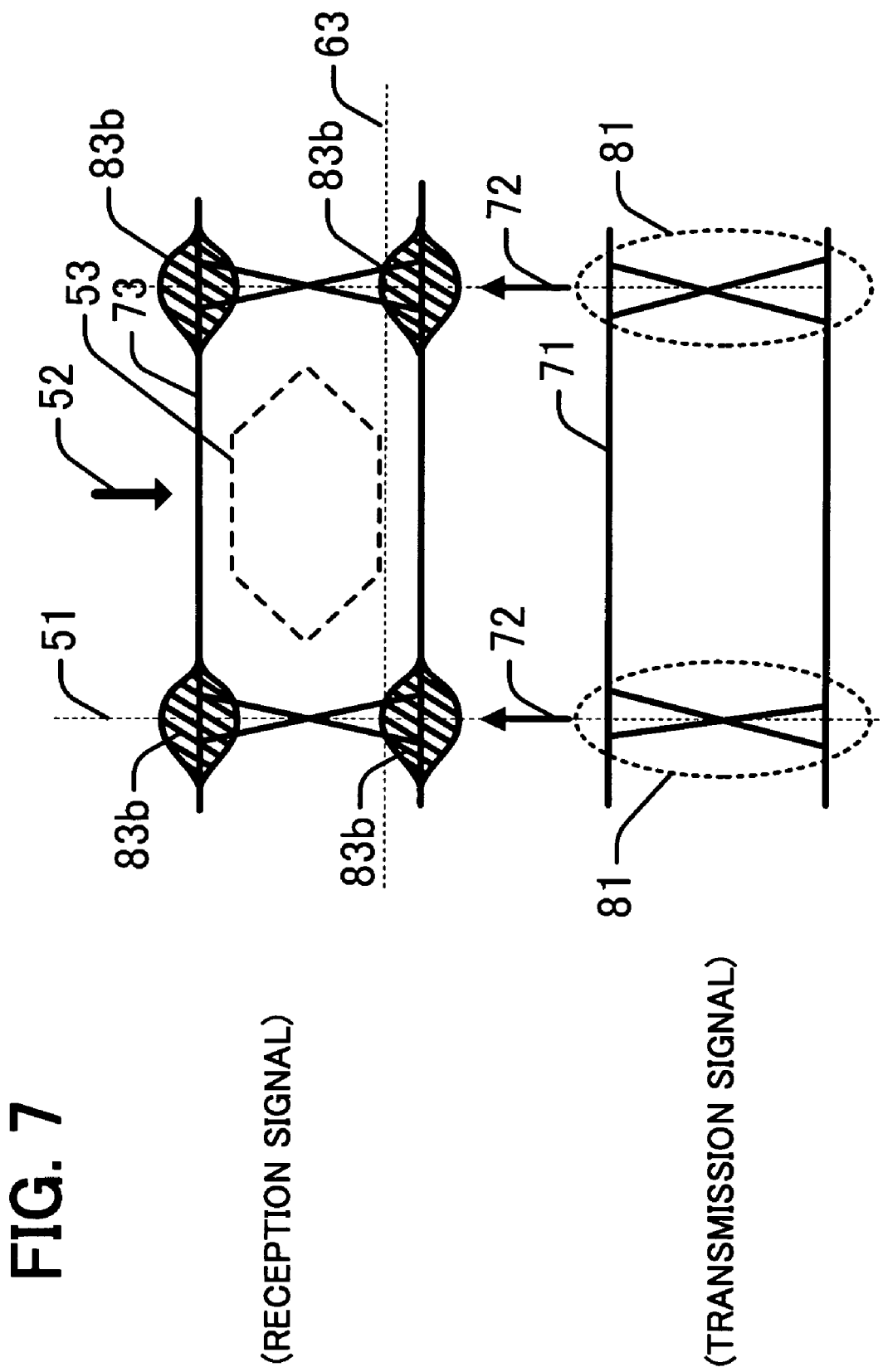
FIG. 7 illustrates the third display example of the eye pattern of the reception signal.

FIG. 7 illustrates the third display example of the eye pattern of the reception signal, in which the bit error rate is expected to be minimized. The eye pattern is shown in association with the phase of the transmission signal.

In the present case, as illustrated in the foregoing FIG. 4, the rise and fall phase 51 of the transmission signal 71 substantially coincides with the rise and fall phase of the bit signal pulses of the reception signal 73. Further, the deterioration of the reception signal 73 due to the crosstalk signal 72 occurring at the timing of the rise and fall phase 51 of the transmission signal 71 occurs in the rising and falling portions 83b of the bit signal pulses. Thus, the mask area 53 of the eye pattern of the reception signal 73 is not intruded. In the bit determination timing 52, therefore, the influence of the crosstalk signal 72 is small, and correct bit determination can be performed.

As described above, the influence of the crosstalk signal 72 from the transmission part on the reception signal 73 can be prevented by appropriately adjusting the phase of the transmission signal 71. In the active mode, however, the transmission data is transferred from the circuit 200 not in synchronization with the reception data. It is therefore difficult to adjust the phase of the transmission signal 71. However, as described above, if the optimal threshold value minimizing the bit error rate at the worst phase of the transmission signal 71 is obtained and set as the reception threshold value in the test mode, and if the test mode is thereafter switched to the active mode, a signal can be also received in the active mode in the state in which the influence of the crosstalk is small irrespective of the phase of the transmission signal 71.

Figure 8:
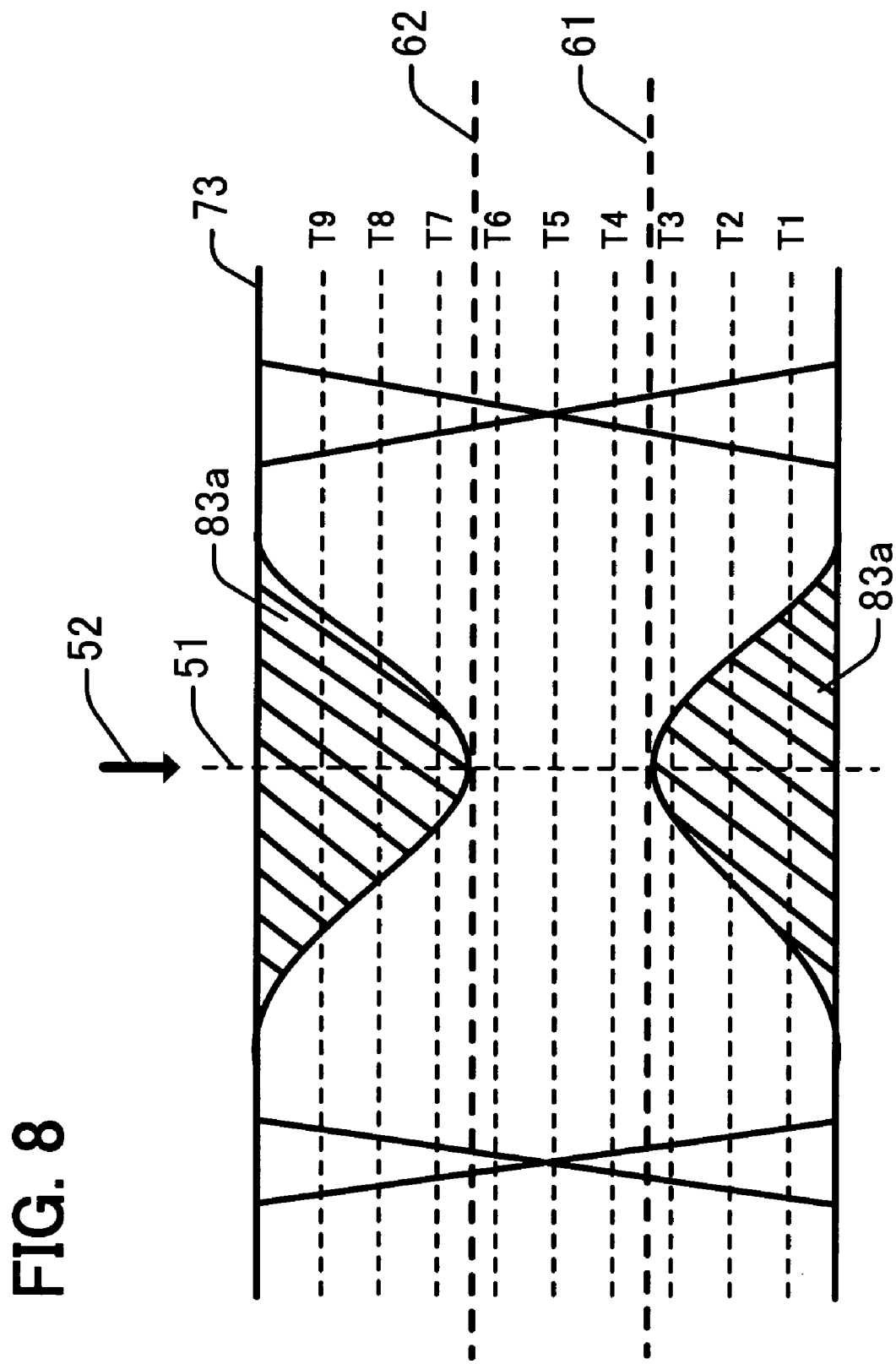
FIG. 8 is a conceptual diagram illustrating a method of obtaining an optimal threshold value of the reception signal according to the embodiment.

FIG. 8 is a conceptual diagram illustrating a method of obtaining the optimal threshold value of the reception signal.

In the example illustrated herein, the bit error rate is measured with a predetermined measurement interval, which is a value dividing the maximum amplitude of the reception signal into ten equal segments with threshold values T1 to T9.

As illustrated in the second display example of the eye pattern of the reception signal in the foregoing FIG. 6, the optimal threshold value of the reception signal in the state of the worst phase can be selected as a value between the threshold values 61 and 62.

The selection of the optimal threshold value from the values between the threshold values 61 and 62 can be performed by one of the following methods, for example.

(1) The bit error rate is measured while the reception threshold value is shifted by a predetermined interval in a stepwise manner, with the initial value set to a value with which the bit error is expected to occur (e.g., T1). Then, the threshold value minimizing the bit error rate is determined as the optimal threshold value.

(2) The initial value of the reception threshold value is set to a sufficiently small or large threshold value with which the bit error is expected to occur (e.g., T1 or T9), and the set value of the reception threshold value is increased or decreased by a predetermined value. Then, the reception threshold value with which the bit error rate first falls below a predetermined allowable bit error rate, e.g., $10^{-9}$ (e.g., T4 or T6) is multiplied by a predetermined coefficient, and the resultant value is determined as the optimal threshold value.

(3) The first initial value of the reception threshold value is set to a sufficiently small threshold value with which the bit error is expected to occur (e.g., T1). Then, the set value of the reception threshold value is increased by a predetermined value, and the reception threshold value with which the bit error rate first falls below a predetermined allowable bit error rate, e.g., $10^{-9}$ (e.g., T4) is determined as the first threshold value. Meanwhile, the second initial value of the reception threshold value is set to a sufficiently large threshold value with which the bit error is expected to occur (e.g., T9). Then, the set value of the reception threshold value is decreased by a predetermined value, and the reception threshold value with which the bit error rate first falls below a predetermined allowable bit error rate, e.g., $10^{-9}$ (e.g., T6) is determined as the second threshold value. Then, the intermediate value between the first and second threshold values (e.g., T5) is determined as the optimal threshold value.

Figure 9:
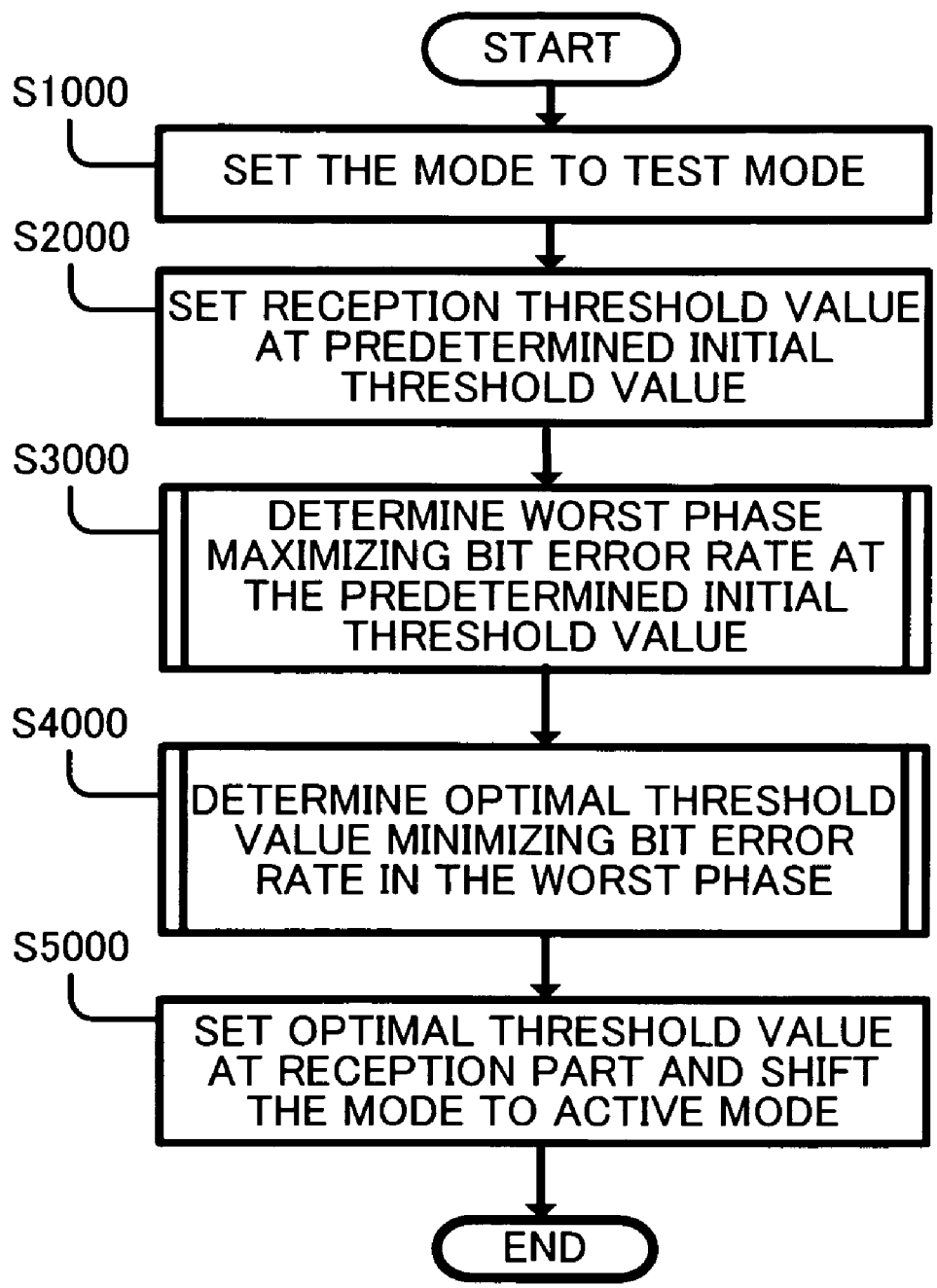
FIG. 9 is the first flowchart illustrating a method of adjusting a reception threshold value according to the embodiment.

FIG. 9 is the first flowchart illustrating a method of adjusting the reception threshold value according to the embodiment.

At Step S1000, the operation mode of the data transmission and reception module is set to the test mode.

At Step S2000, the reception threshold value is set to a predetermined initial threshold value. The initial threshold value may be set to, for example, a sufficiently small threshold value with which the bit error is expected to occur (e.g., the threshold value 63 shown in the display example of the eye pattern in the foregoing FIG. 6).

At Step S3000, the bit error rate is measured at the predetermined reception threshold value set at the Step S2000, while the phase of the transmission signal is shifted by a predetermined value in a stepwise manner. Then, the phase maximizing the bit error rate is located and determined as the worst phase. Details of the present step will be later described with reference to FIG. 10.

At Step S4000, the reception threshold value minimizing the bit error rate in the state of the worst phase located at the Step S3000 is obtained and determined as the optimal threshold value. Details of the present step will be later described with reference to FIG. 11.

At Step S5000, the optimal threshold value obtained at the Step S4000 is set as the reception threshold value, and the mode is shifted to the active mode.

Figure 10:
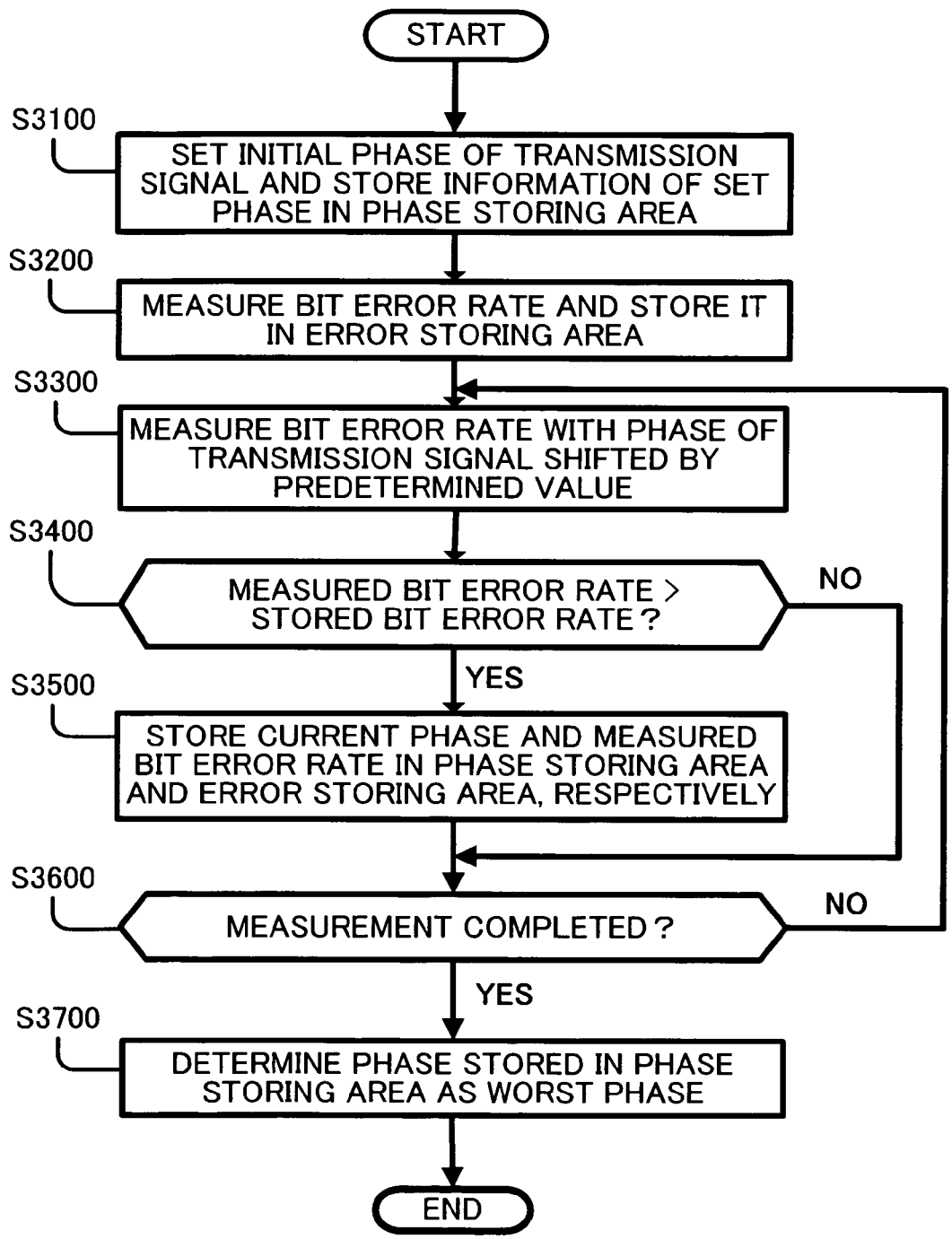
FIG. 10 is the second flowchart illustrating the method of adjusting the reception threshold value according to the embodiment.

FIG. 10 is the second flowchart illustrating the method of adjusting the reception threshold value according to the embodiment. The flowchart illustrates the details of the Step S3000 described in the flowchart of the foregoing FIG. 9.

At Step S3100, the initial phase of the transmission signal is set, and information of the set phase is stored in a phase storing area which is provided, for example, in the control part 20 of FIG. 2. The initial phase may be set to, for example, the same phase as the phase of the reception signal.

At Step S3200, the bit error rate at the initial phase is measured and stored in an error storing area which is provided, for example, in the control part 20 of FIG. 2.

At Step S3300, the bit error rate is measured, with the phase of the transmission signal shifted by a predetermined value.

At Step S3400, it is determined whether or not the currently measured bit error rate is higher than the bit error rate stored in the error storing area. If the currently measured bit error rate is higher than the stored bit error rate (YES), the procedure shifts to the next Step S3500. If the currently measured bit error rate is not higher than the stored bit error rate (NO), the procedure shifts to Step S3600.

At Step S3500, the current phase of the transmission signal and the measured bit error rate are stored in the phase storing area and the error storing area, respectively.

At Step S3600, it is determined whether or not the measurement of the bit error rate has been completed at all measurement points. If the measurement has been completed (YES), the procedure shifts to the next Step S3700. If the measurement has not been completed (NO), the procedure returns to the Step S3300 to perform the next measurement.

At Step S3700, the phase information stored in the phase storing area is determined as the worst phase.

As described above, the bit error rate is measured while the phase of the transmission signal is shifted by a predetermined value, and the phase maximizing the bit error rate is determined as the worst phase of the transmission signal. Thereby, the worst phase can be accurately located, even if the timing maximizing the crosstalk signal from the transmission part is deviated from the rise and fall timing of the transmission signal due to some sort of environmental condition and so forth.

Figure 11:
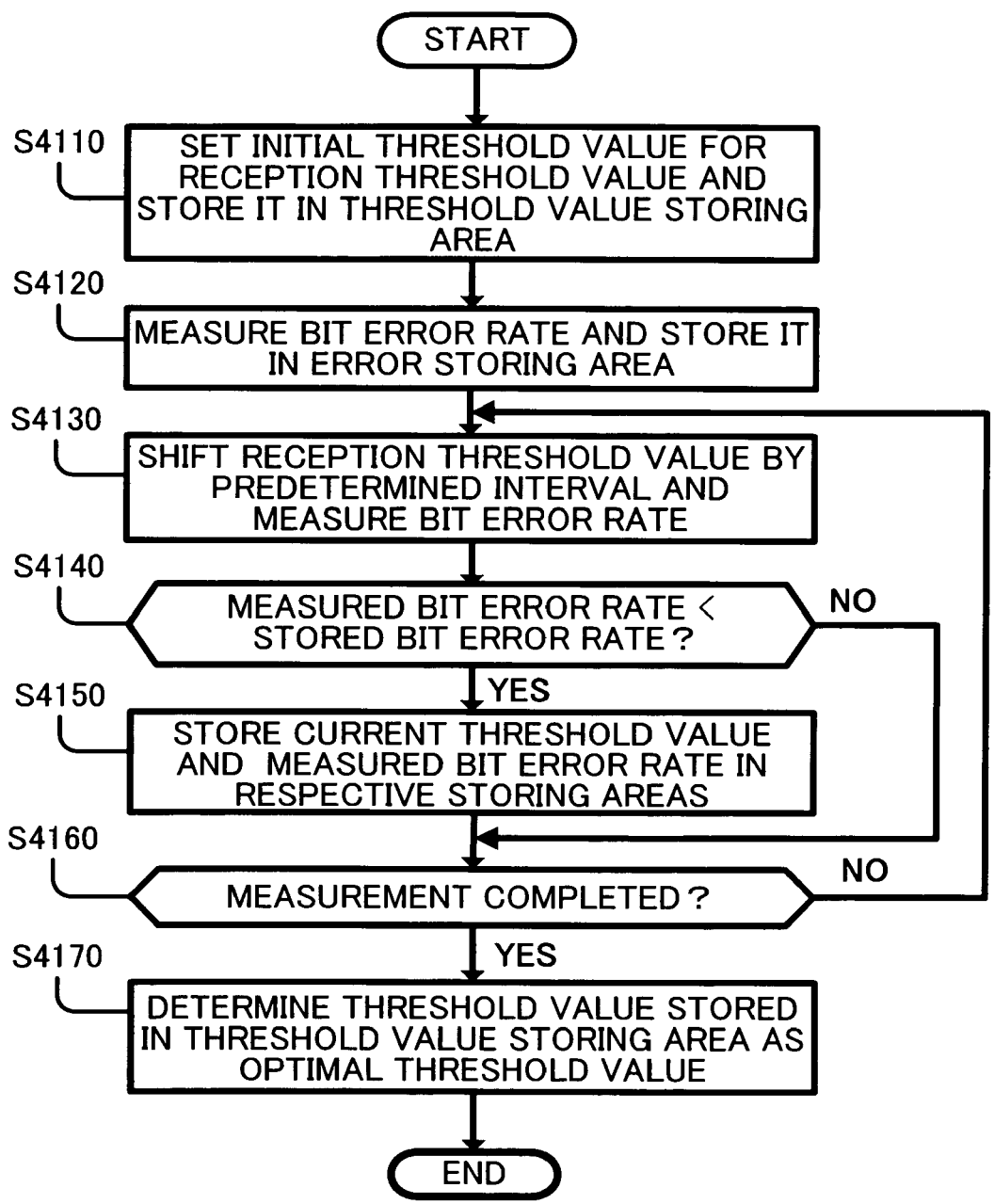
FIG. 11 is the third flowchart illustrating the method of adjusting the reception threshold value according to the embodiment.

FIG. 11 is the third flowchart illustrating the method of adjusting the reception threshold value according to the embodiment. The flowchart illustrates a first embodiment for achieving the Step S4000 described in the flowchart of the foregoing FIG. 9.

At Step S4110, the initial threshold value is set for the reception threshold value, and the set initial threshold value is stored in a threshold value storing area which is provided, for example, in the control part 20 of FIG. 2. The initial threshold value may be set to, for example, a sufficiently small or large threshold value with which the bit error is expected to occur.

At Step S4120, the bit error rate is measured, and the measured bit error rate is stored in the error storing area.

At Step S4130, a value shifted from the currently set reception threshold value by a predetermined interval is set in the threshold value adjusting part as a new threshold value, and the bit error rate is measured. In this step, if a sufficiently small threshold value has been set as the initial threshold value at the Step S4110, the reception threshold value is shifted by a predetermined interval in the increasing direction. Meanwhile, if a sufficiently large threshold value has been set as the initial threshold value at the Step S4110, the reception threshold value is shifted by a predetermined interval in the decreasing direction.

At Step S4140, it is determined whether or not the currently measured bit error rate is smaller than the bit error rate stored in the error storing area. If the currently measured bit error rate is smaller than the stored bit error rate (YES), the procedure shifts to the next Step S4150. If the currently measured bit error rate is not smaller than the stored bit error rate (NO), the procedure shifts to Step S4160.

At Step S4150, the threshold value set in the threshold value adjusting part and the currently measured bit error rate are stored in the threshold value storing area and the error storing area, respectively.

At Step S4160, it is determined whether or not the measurement of the bit error rate has been completed at all measurement points. If the measurement has been completed (YES), the procedure shifts to the next Step S4170. If the measurement has not yet been completed (NO), the procedure returns to the Step S4130 to perform the next measurement.

At Step S4170, the reception threshold value stored in the threshold value storing area is determined as the optimal threshold value.

In the above-described method, the bit error rate is measured over the entire amplitude of the reception signal. Then, the threshold value with which the bit error rate is the lowest within the error range of the comparison and determination operation of the bit error rate performed at the Step S4140 is selected as the optimal threshold value. In this case, the value of the threshold value 61 or 62 shown in the foregoing FIG. 8, which constitutes a boundary across which the deterioration of the reception signal occurs due to the influence of the crosstalk, is not necessarily specified. Instead, the threshold value with which the bit error rate is the lowest within the entire amplitude of the reception signal serves as the optimal threshold value. Therefore, the optimal threshold value may be close to the threshold value 61 or 62, or may be in an intermediate area between the threshold values 61 and 62.

Figure 12:
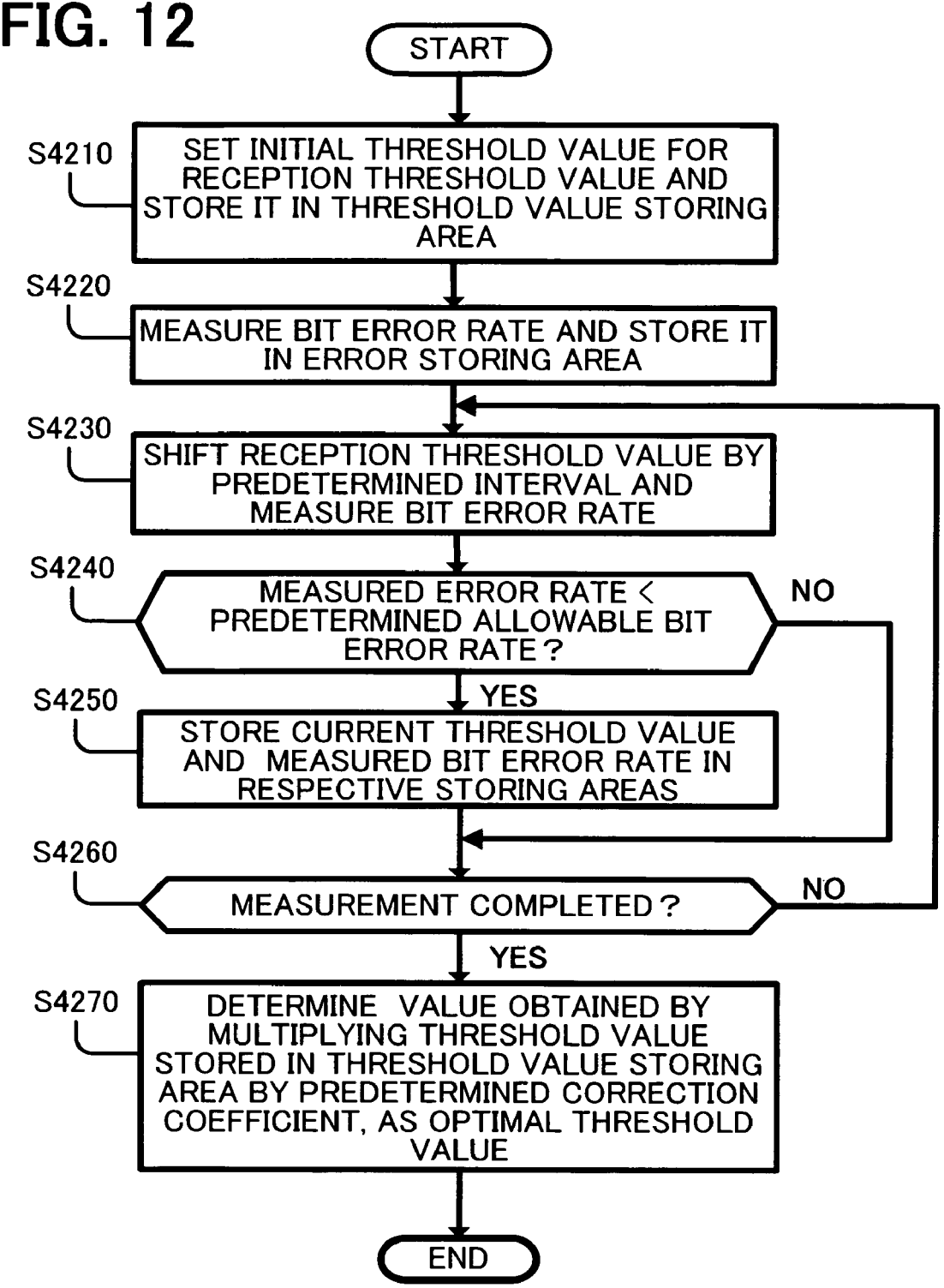
FIG. 12 is the fourth flowchart illustrating the method of adjusting the reception threshold value according to the embodiment.

FIG. 12 is the fourth flowchart illustrating the method of adjusting the reception threshold value according to the embodiment. The flowchart illustrates a second embodiment for achieving the Step S4000 described in the flowchart of the foregoing FIG. 9.

At Step S4210, the initial threshold value is set for the reception threshold value, and the set initial threshold value is stored in the threshold value storing area. The initial threshold value may be set to, for example, a sufficiently small or large threshold value with which the bit error is expected to occur.

At Step S4220, the bit error rate is measured, and the measured bit error rate is stored in the error storage area.

At Step S4230, a value shifted from the currently set reception threshold value by a predetermined interval is set in the threshold value adjusting part as a new threshold value, and the bit error rate is measured. In this step, if a sufficiently small threshold value has been set as the initial threshold value at the Step S4210, the reception threshold value is shifted by a predetermined interval in the increasing direction. Meanwhile, if a sufficiently large threshold value has been set as the initial threshold value at the Step S4210, the reception threshold value is shifted by a predetermined interval in the decreasing direction.

At Step S4240, it is determined whether or not the currently measured bit error rate is smaller than a predetermined allowable bit error rate. If the currently measured bit error rate is smaller than the predetermined allowable bit error rate (YES), the procedure shifts to the next Step S4250. If the currently measured bit error rate is not smaller than the predetermined allowable bit error rate (NO), the procedure shifts to Step S4260.

At Step S4250, the threshold value set in the threshold value adjusting part and the currently measured bit error rate are stored in the threshold value storing area and the error storing area, respectively.

At Step S4260, it is determined whether or not the measurement of the bit error rate has been completed at all measurement points. If the measurement has been completed (YES), the procedure shifts to the next Step S4270. If the measurement has not yet been completed (NO), the procedure returns to the Step S4230 to perform the next measurement.

At Step S4270, a value obtained by multiplying the threshold value stored in the threshold value storage area by a predetermined correction coefficient is determined as the optimal threshold value. The correction coefficient is a value determined by the method of configuring the data transmission and reception module, the environmental condition, and so forth. The correction coefficient may be, for example, a value 10% to 20% greater than the threshold value, i.e., a value approximately between 1.1 and 1.2. Thereby, the optimal threshold value can be set not to a value close to the threshold value 61 or 62 shown in the foregoing FIG. 6, which constitutes the boundary across which the bit error occurs, but to a value in the intermediate area between the threshold values 61 and 62. Accordingly, the occurrence probability of the bit error can be further reduced.

In the above-described method, it is determined at the Step S4240 whether or not the measured bit error rate is smaller than the predetermined allowable bit error rate. Therefore, the value of the threshold value 61 or 62 shown in the foregoing FIG. 8, which constitutes the boundary across which the deterioration of the reception signal occurs due to the influence of the crosstalk, can be accurately specified. As a result, the optimal threshold value can be appropriately selected from the intermediate area between the threshold values 61 and 62. Further, the bit error rate does not need to be measured over the entire amplitude of the reception signal by appropriately configuring the determination of measurement completion at the Step 4260 of FIG. 12. Accordingly, the optimal threshold value can be effectively obtained.

Figure 13:
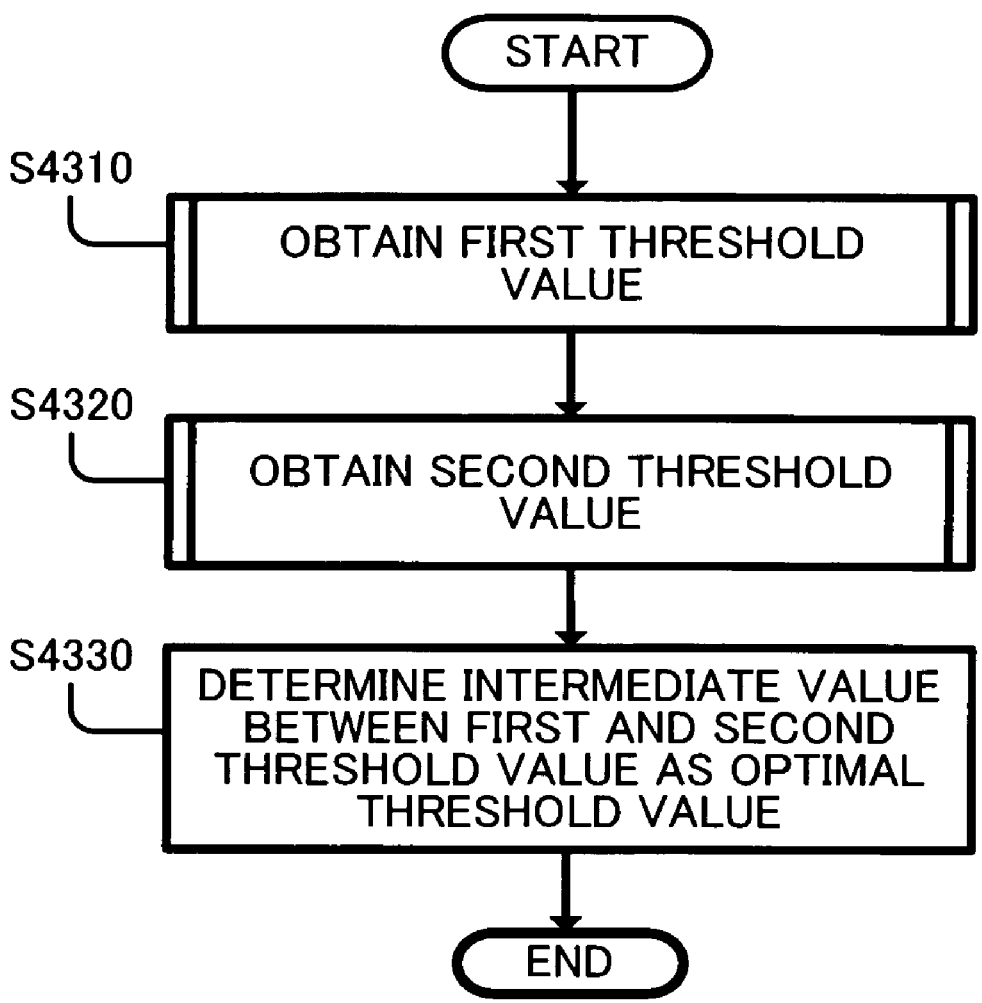
FIG. 13 is the fifth flowchart illustrating the method of adjusting the reception threshold value according to the embodiment.

FIG. 13 is the fifth flowchart illustrating the method of adjusting the reception threshold value according to the embodiment. The flowchart illustrates a third embodiment for achieving the Step S4000 described in the flowchart of the foregoing FIG. 9.

At Step S4310, the initial threshold value is set to a sufficiently small threshold value with which the bit error is expected to occur, and the first threshold value (a value approximating the threshold value 61 of the foregoing FIG. 8, e.g., T4) is obtained. Details of the present step will be later described with reference to FIG. 14.

At Step S4320, the initial threshold value is set to a sufficiently large threshold value with which the bit error is expected to occur, and the second threshold value (a value approximating the threshold value 62 of the foregoing FIG. 8, e.g., T6) is obtained. Details of the present step will be later described with reference to FIG. 15.

At Step S4330, the intermediate value between the first and second threshold values obtained at the Steps S4310 and S4320 (T5 in the example of FIG. 8) is determined as the optimal threshold value.

Accordingly, as illustrated in the foregoing FIG. 8, it is possible to obtain, as the optimal threshold value, the threshold value least subject to the influence of the distortion in the waveform of the reception signal 73 caused by the crosstalk.

Figure 14:
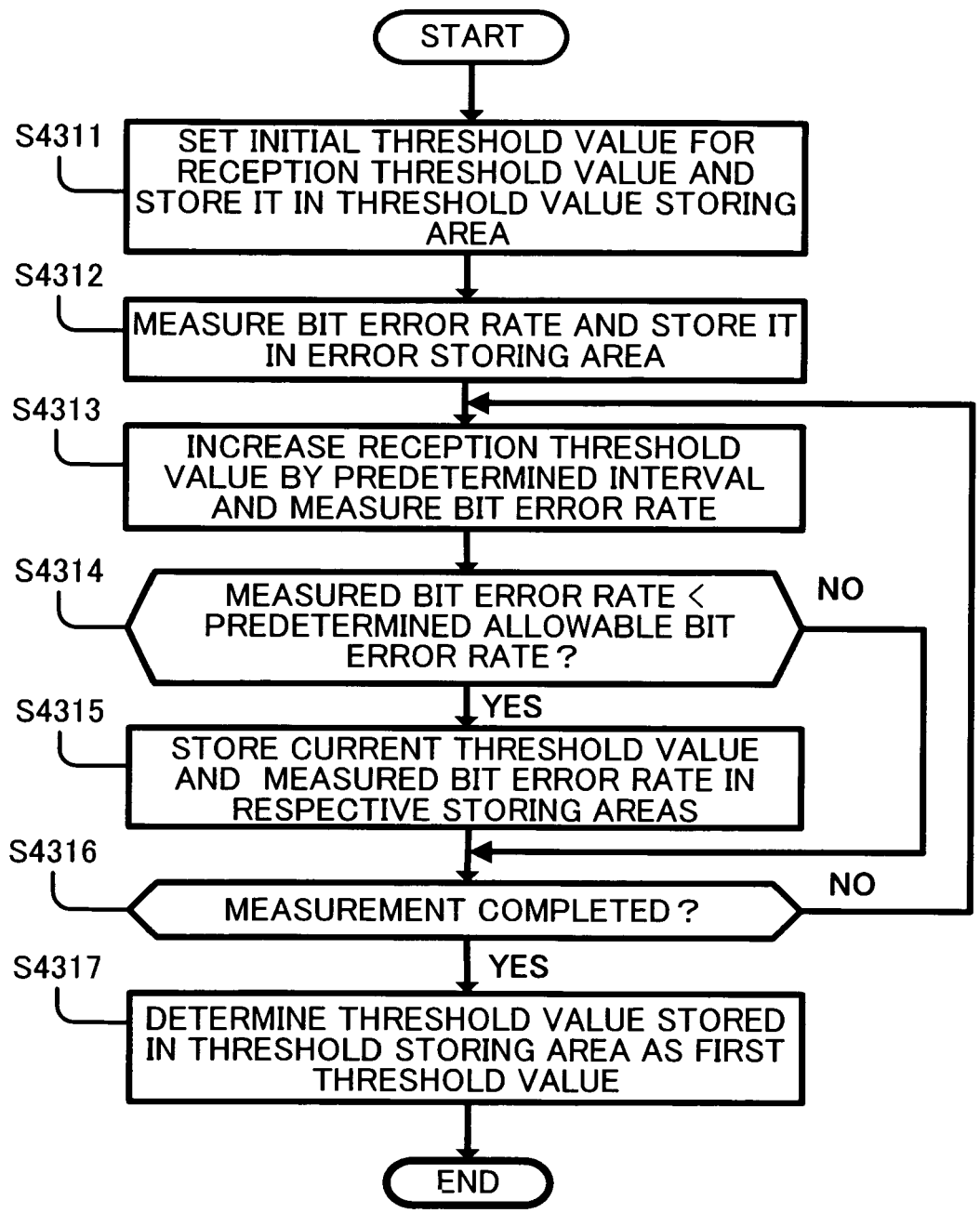
FIG. 14 is the sixth flowchart illustrating the method of adjusting the reception threshold value according to the embodiment.

FIG. 14 is the sixth flowchart illustrating the method of adjusting the reception threshold value according to the embodiment. The flowchart illustrates the details of the Step S4310 described in the flowchart of the foregoing FIG. 13.

At Step S4311, the initial threshold value is set for the reception threshold value, and the set initial threshold value is stored in the threshold value storing area. The initial threshold value may be set to a sufficiently small threshold value with which the bit error is expected to occur (e.g., T1 of FIG. 8).

At Step S4312, the bit error rate is measured, and the measured bit error rate is stored in the error storing area.

At Step S4313, a value increased from the currently set reception threshold value by a predetermined interval is set in the threshold value adjusting part as a new threshold value, and the bit error rate is measured.

At Step S4314, it is determined whether or not the currently measured bit error rate is smaller than a predetermined allowable bit error rate. If the currently measured bit error rate is smaller than the predetermined allowable bit error rate (YES), the procedure shifts to the next Step S4315. If the currently measured bit error rate is not smaller than the predetermined allowable bit error rate (NO), the procedure shifts to Step S4316.

At Step S4315, the threshold value set in the threshold value adjusting part and the currently measured bit error rate are stored in the threshold value storing area and the error storing area, respectively.

At Step S4316, it is determined whether or not the measurement of the bit error rate has been completed at all measurement points. If the measurement has been completed (YES), the procedure shifts to the next Step S4317. If the measurement has not yet been completed (NO), the procedure returns to the Step S4313 to perform the next measurement.

At Step S4317, the threshold value stored in the threshold value storing area is determined as the first threshold value.

Figure 15:
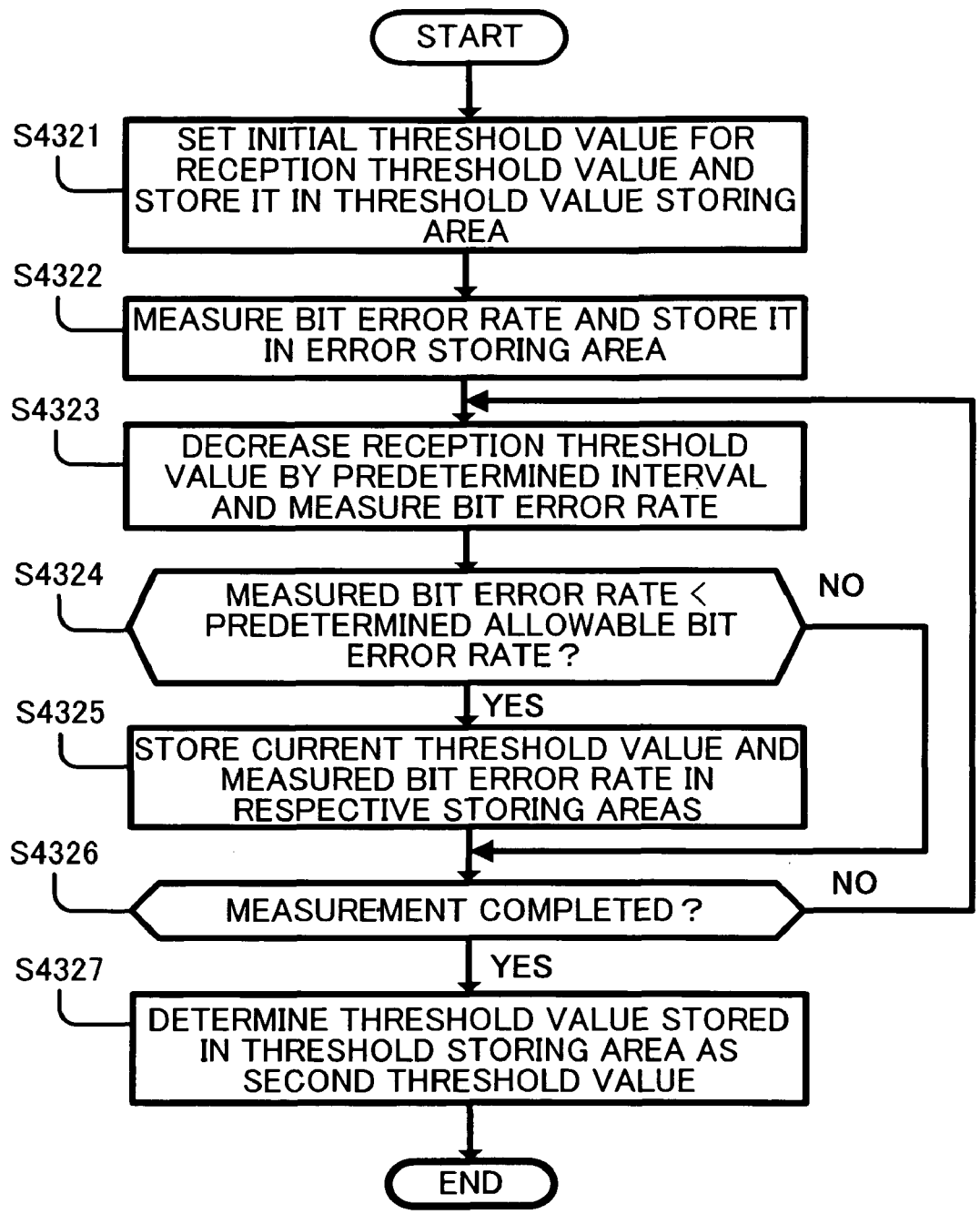
FIG. 15 is the seventh flowchart illustrating the method of adjusting the reception threshold value according to the embodiment.

FIG. 15 is the seventh flowchart illustrating the method of adjusting the reception threshold value according to the embodiment. The flowchart illustrates the details of the Step S4320 described in the flowchart of the foregoing FIG. 13.

At Step S4321, the initial threshold value is set for the reception threshold value, and the set initial threshold value is stored in the threshold value storing area. The initial threshold value may be set to a sufficiently large threshold value with which the bit error is expected to occur (e.g., T9 of FIG. 8).

At Step S4322, the bit error rate is measured, and the measured bit error rate is stored in the error storing area.

At Step S4323, a value decreased from the currently set reception threshold value by a predetermined interval is set in the threshold value adjusting part as a new threshold value, and the bit error rate is measured.

At Step S4324, it is determined whether or not the currently measured bit error rate is smaller than a predetermined allowable bit error rate. If the currently measured bit error rate is smaller than the predetermined allowable bit error rate (YES), the procedure shifts to the next Step S4325. If the currently measured bit error rate is not smaller than the predetermined allowable bit error rate (NO), the procedure shifts to Step S4326.

At Step S4325, the threshold value set in the threshold value adjusting part and the currently measured bit error rate are stored in the threshold value storing area and the error storing area, respectively.

At Step S4326, it is determined whether or not the measurement of the bit error rate has been completed at all measurement points. If the measurement has been completed (YES), the procedure shifts to the next Step S4327. If the measurement has not yet been completed (NO), the procedure returns to the Step S4323 to perform the next measurement.

At Step S4327, the threshold value stored in the threshold value storage area is determined as the second threshold value.

Each of the first to seventh flowcharts illustrating the method of adjusting the reception threshold value according to the embodiment presents one example, and the processing flowchart can be modified in various ways. The modification, however, does not affect the nature of the embodiment.

What is claimed is:

1. A method of adjusting a reception threshold value, the method being executed by an apparatus for performing data transmission and reception, the method comprising:
    generating a transmission signal based upon a clock regenerated from a reception signal;
    setting the reception threshold value at a first initial threshold value;
    detecting a first bit error rate of the reception signal by repeatedly shifting a phase of the transmission signal by a predetermined value in a state where the reception threshold value is being fixed to the first initial threshold value;
    determining the phase of the transmission signal at which the detected first bit error rate of the reception signal is maximized, as a worst phase of the transmission signal; and
    adjusting the reception threshold value to an optimum reception threshold value in a state where the phase of the transmitting signal is being fixed to the determined worst phase, by:
        setting the reception threshold value at a second initial threshold value,
        detecting a second bit error rate of the reception signal by shifting the reception threshold value from the second initial threshold value by a predetermined interval in a predetermined direction, and
        determining the optimum reception threshold value using the detected second bit error rate.

2. The method of claim 1, wherein
the reception threshold value minimizing the detected second bit error rate is determined to be the optimum threshold value.

3. The method of claim 1, wherein
the reception threshold value is adjusted to the optimum reception threshold value by:
    obtaining the reception threshold value making the second bit error rate first fall below a predetermined allowable bit error rate; and
    determining a value obtained by multiplying the obtained reception threshold value by a predetermined correction coefficient as the optimum reception threshold value.

4. The method of claim 1, wherein
the second bit error rate is detected by shifting the reception threshold value from the second initial threshold value by the predetermined interval in an increasing direction;

the reception threshold value making the second bit error rate first fall below a first allowable bit error rate is determined to be a first reception threshold value; and the reception threshold value is adjusted to the optimum reception threshold value by:

setting the reception threshold value at a third initial threshold value;

detecting a third bit error rate of the reception signal by shifting the reception threshold value from the third initial threshold value by the predetermined interval in a decreasing direction;

determining the reception threshold value making the third bit error rate first fall below a second allowable bit error rate, as a second reception threshold value; and determining an intermediate value between the first reception threshold value and the second reception threshold value as the optimum reception threshold value.

5. An apparatus for performing data transmission and reception, comprising:

a threshold value adjusting part configured to adjust a reception threshold value and to perform a bit determination of the reception signal based upon the adjusted reception threshold value;

a signal monitoring part configured to detect a first bit error rate of the reception signal output from the threshold value adjusting part;

a clock regenerating part configured to regenerate a clock by extracting clock information from the reception signal output from the threshold value adjusting part;

a signal generating part configured to generate a signal based upon the clock regenerated by the clock generating part;

a phase varying part configured to adjust a phase of the signal generated by the signal generating part a transmission part configured to transmit the signal adjusted by the phase varying part as a transmission signal, and a control part configured to control each part included in the apparatus such that:

the reception threshold value is set at a first initial threshold value, the first bit error rate of the reception signal is detected by shifting a phase of the transmission signal by a predetermined value in a state where the reception threshold value is being fixed to the first initial threshold value, the phase of the transmission signal at which the detected first bit error rate of the reception signal is maximized, is determined as a worst phase of the transmission signal, and the reception threshold value is adjusted to an optimum reception threshold value in a state where the phase of the transmitting signal is being fixed to the determined worst phase, by:

setting the reception threshold value at a second initial threshold value, detecting a second bit error rate of the reception signal by shifting the reception threshold value from the second initial threshold value by a predetermined interval in a predetermined direction, and determining the optimum reception threshold value using the detected second bit error rate.

6. The apparatus of claim 5, wherein the reception threshold value minimizing the detected second bit error rate is determined as the optimum reception threshold value.

7. The apparatus of claim 5, wherein the reception threshold value is adjusted to the optimum reception threshold value by:

obtaining the reception threshold value making the second bit error rate first fall below a predetermined allowable bit error rate is obtained, and determining a value obtained by multiplying the obtained reception threshold by a predetermined correction coefficient as the optimum reception threshold value.

8. The apparatus of claim 5, wherein the second bit error rate is detected by shifting the reception threshold value from the second initial threshold value by the predetermined interval in an increasing direction, the reception threshold value making the bit error rate first fall below a first allowable bit error rate is determined as a first reception threshold value, and the reception threshold value is adjusted to the optimum reception threshold value by:

setting the reception threshold value at a third initial threshold value, detecting a third bit error rate by shifting the reception threshold value from the third initial threshold value by the predetermined interval in a decreasing direction, determining the reception threshold value making the third bit error rate first fall below a second allowable bit error rate as a second reception threshold value, and determining an intermediate value between the first reception threshold value and the second reception threshold value as the optimum reception threshold value.

* * * * *